Feb. 10, 1970  R. M. WEYGANDT ET AL  3,494,117
BERRY PICKING MACHINE
Filed June 13, 1967  2 Sheets-Sheet 1
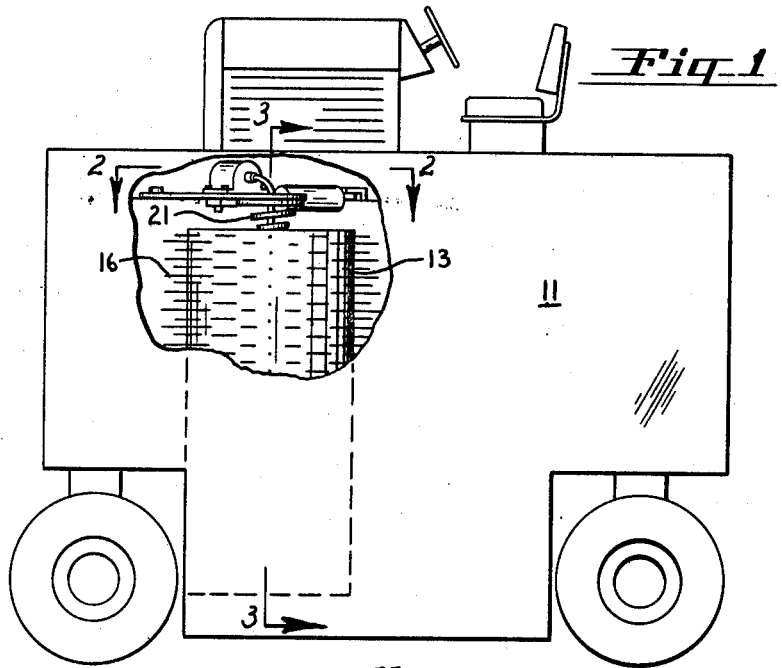
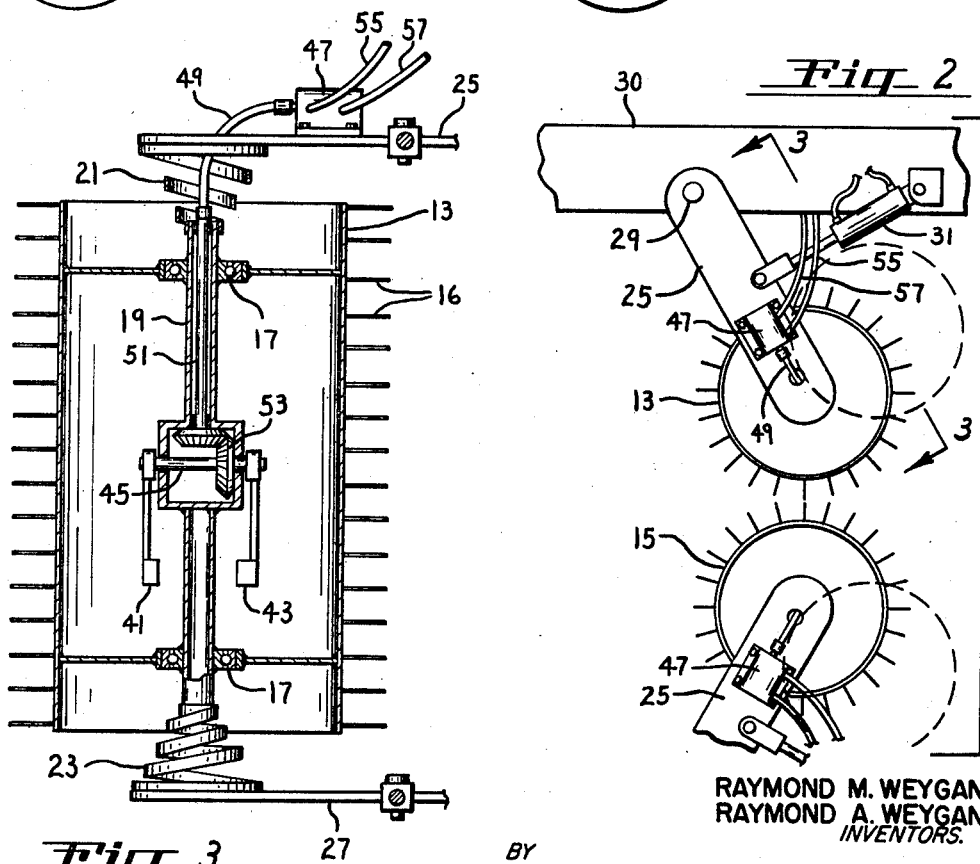
RAYMOND M. WEYGANDT
RAYMOND A. WEYGANDT
INVENTORS.
BY
BUCKHORN, BLORE, KLARQUIST & SPARKMAN
ATTORNEYS

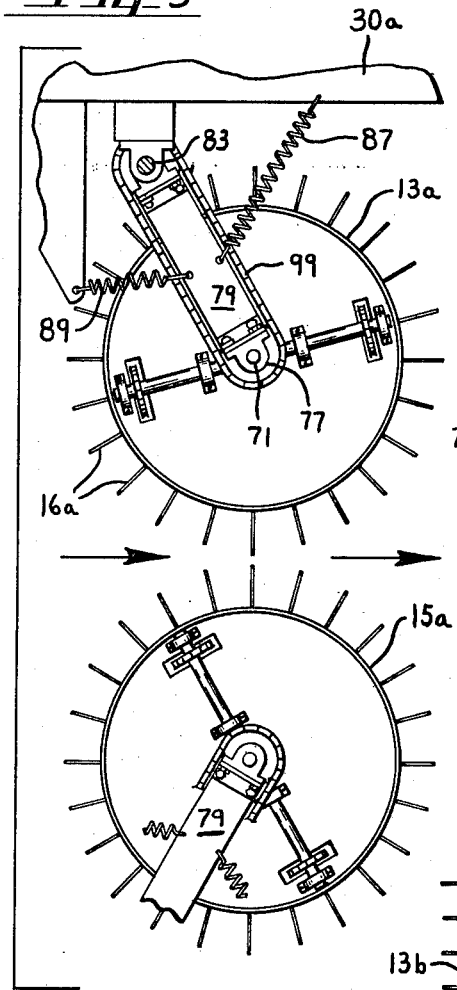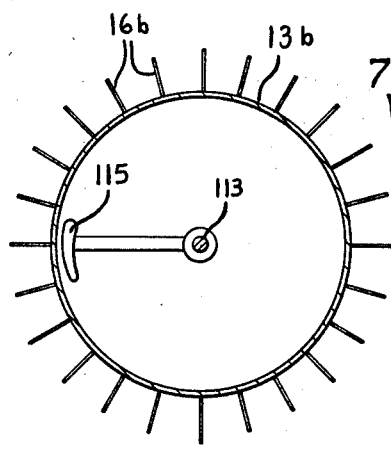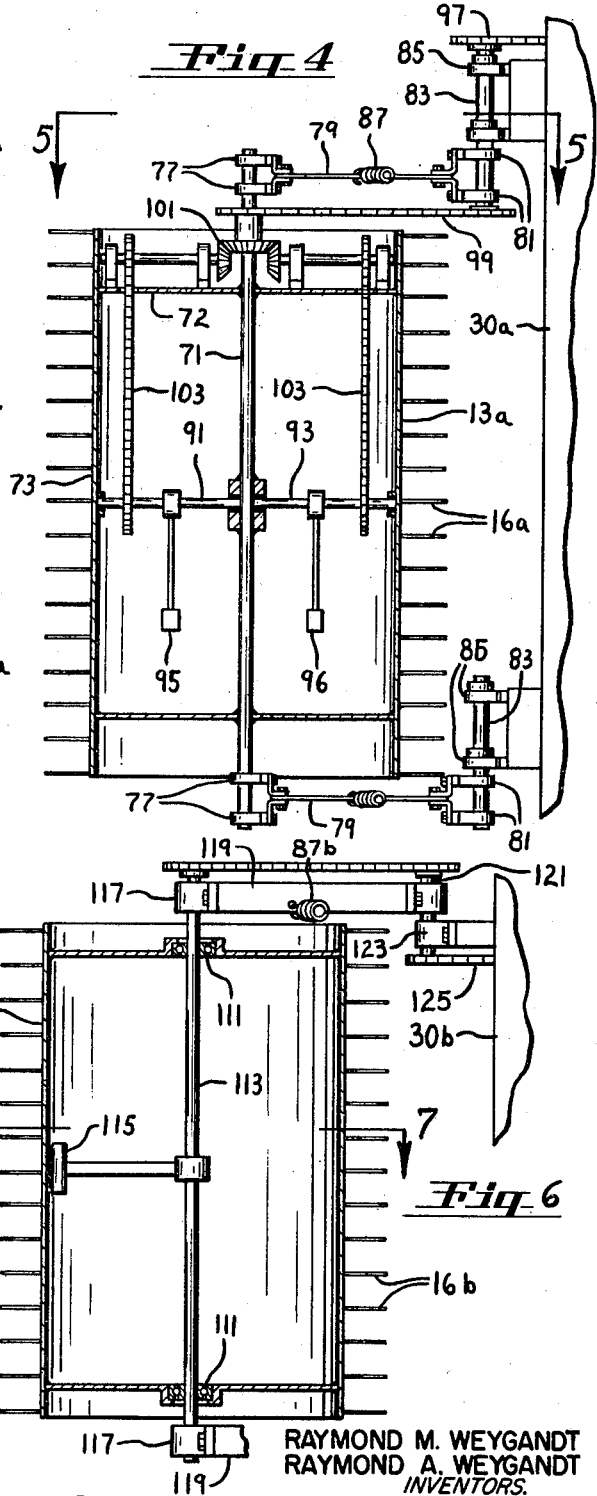

United States Patent Office 3,494,117
Patented Feb. 10, 1970

---

3,494,117
BERRY PICKING MACHINE
Raymond M. Weygandt and Raymond A. Weygandt,
both of Rte. 1, Canby, Oreg. 97013
Filed June 13, 1967, Ser. No. 645,792
Int. Cl. A01g *19/00*
U.S. Cl. 56—330                                    13 Claims

ABSTRACT OF THE DISCLOSURE

A mobile row-type berry harvester having opposed upright tined heads mounted for free-wheeling contact with the berry plants, the heads being actuated to cause the active tines to move in equal circular paths wherein (1) the circular movement of the tines is uniform from end to end thereof and (2) the magnitude or amplitude of movement of the tines in relation to their spacing is such that the tines have a greater berry-dislodging coverage of the fruit bearing regions or areas of the plants than heretofore provided.

BACKGROUND OF THE INVENTION

Field of invention

This invention relates to row-type berry harvesters which are used to harvest berries from rows of berry plants, the plants usually being berry bushes but could be vines held or supported upright. The invention particularly relates to harvesters including a self-powered row straddling vehicle carrying one or more, usually two, tined heads which are mounted for rotary movement on opposite sides of a row and are specially actuated to shake the plants to dislodge berries therefrom.

Prior art

It is believed that some of the prior art is referred to in our own prior Patent 3,245,211, the patent to Rust 3,184,908 and the pending patent application to Studer entitled "Vibratory Fruit Harvester," filed Sept. 18, 1964, Ser. No. 397,536 and now Patent 3,413,789.

In prior machines the tines are merely vibrated and the vibration is not of uniform amplitude from end to end of the tines so that the inner portions of the tines have poor berry-dislodging action as compared to their outer portions, or if the vibration is uniform, the actuation is such that the tines operate in isolated zones to attain only incomplete coverage of the fruit bearing area of the plants.

In the present invention, the tines are so actuated that the inner ends of the tines are as effective as the outer ends and furthermore are so actuated as to tend toward or attain overlapping paths of movement to obtain greater or complete berry-dislodging coverage of the fruit bearing areas of the plants.

BRIEF SUMMARY OF THE INVENTION

In two forms of the invention a head is spring mounted, and an orbital or circular movement is imparted to the head and thus to the tines, wherein the orbited path is in an upright plane. In the other form of the invention the head is swingably mounted and it and its tines are caused to oscillate in a horizontal plane about the swinging axis.

BRIEF DESCRIPTION OF THE DRAWINGS

FIG. 1 is a somewhat diagrammatic side elevational view of a berry harvester with parts broken away to show the far-side head;

FIG. 2 is a fragmentary horizontal view taken along line 2—2 of FIG. 1;

FIG. 3 is an enlarged elevational view of a head taken in the direction of the arrows 3—3 of FIG. 2, with parts broken back to midsection for convenience in illustration;

FIG. 4 is a fragmentary vertical view of a modified form of head-mounting and actuating arrangement, with parts broken back to midsection (or approximately midsection) for convenience in illustration;

FIG. 5 is a fragmentary horizontal section taken along line 5—5 of FIG. 4;

FIG. 6 is a fragmentary elevational view like FIG. 4 but showing a further form of head-mounting and actuating arrangement, with parts broken back to midsection (or approximately midsection) for convenience in illustration; and FIG. 7 is a horizontal sectional view taken along line 7—7 of FIG. 6.

The row-type berry harvester shown comprises a powered mobile vehicle 11 which may be like that shown in our prior Patent 3,245,211 except isofar as the mounting and actuating means for the tined heads 13 and 15 thereof are concerned. Thus it will be understood that there is some form of berry catching and conveying means (not shown) disposed at least in part below the heads 13 and 15 to catch the berries dislodged by the tines 16 of the heads and convey them to a discharge station on the vehicle. These means may be like that shown in our prior Patent 3,245,211.

The heads 13 and 15 are similarly mounted and driven and so only head 13 will be described in detail. Referring to FIGS. 3 and 4, the head 13 is a hollow drum having bearings 17 freely rotatably supporting the head on a hollow mounting tube or shaft 19. Heavy conical coil springs 21 and 23 connect the ends of the shaft 19 to the inner ends of the arms 25 and 27, respectively, which are swingably mounted (at 29 for arm 25) on the frame 30 of the machine. A double acting pneumatic cylinder 31 for the upper arm 25 is utilized to cause the head 13 to assume an inward position in contact with the berry plants, but enables the head to be swung outwardly to enable it to clear the spaced posts on which wires are conventionally strung to support the plants.

Air under pressure is selectively supplied or discharged from the cylinder 31 under the control of a reversing spool valve (not shown) which is interposed between the cylinder and an air pressure reservoir (not shown) on the frame 30 of the machine. The reservoir is supplied with air by a conventional pressure controlled pump (not shown). The reversing valve has either a holding (third) position wherein air in the cylinder is trapped therein, or a third position wherein the ends of the cylinder are connected to the opposite side of an accumulator or cushion device for a reason to presently appear. Thus, after the heads 13 and 15 are swung inwardly to their operative positions, the valve can be shifted to its third position whereby the head is resiliently held against the plants being harvested to enable them to move inwardly or outwardly somewhat depending on the density of the plants, etc., whereby to avoid substantial plant damage.

A circular or orbital movement is imparted to the head 13 by a mechanism which includes a pair of weights 41 and 43 which are mounted on a horizontal shaft 45, which is rotated by a fluid motor 47 via a flexible shaft 49, an inner shaft 51 and bevel gearing 53. The motor 47 is mounted on the arm 25 and actuated by fluid under pressure through lines 55 and 57.

It is evident from FIGS. 1 and 3 that the shaft extends transversely of the vehicle 11 and is maintained in this position by the springs 21 and 23. Hence the weights 41 and 43 rotate about an axis extending transversely of the row of berry plants being harvested. Thus the movement imparted to the head 13 by the weights causes the tines 16 that are in contact with the bushes to orbit or move circularly in a plane angularly related to the length of the tines. In fact, the tines which at any time are disposed transversely of the vehicle (the active tines) orbit in a plane normal to the length of the tines. While the drum 13 is in free-wheeling contact with the berry plants and is caused by such contact to roll along the row of berry plants as the vehicle moves therealong to thereby avoid tearing the plants apart, the orbital or circular movement imparted to the tines 16 by the weights 41 and 43 has a frequency substantially higher than the rather slow rolling movement imparted to the head by the plants, whereby the tines effectively shake the berry plants to dislodge berries therefrom. It is evident that the active tines are actuated to move circularly generally about their stationary positions as centers, and that the magnitude of movement of the tines is uniform from end to end so that the inner ends of the tines have as effective a berry-dislodging action as the outer ends thereof.

Complete or overall berry-dislodging coverage of the fruit bearing areas or regions of the plants can be obtained by making the mass of the weights 41 and 43 sufficiently large in relation to the mass of the head as to cause the circular paths of movement of the tines 16 to overlap. This is the preferable arrangement although greater coverage than heretofore provided is obtained with the present invention by a lesser degree of movement of the tines, say movement approaching an overlapping relationship.

FIGS. 4 and 5 show another form of actuating mechanism wherein each of the drums 13a and 15a has a mounting shaft 71 fixedly secured by end plate 72 to the shell 73 of the drum. FIG. 4 shows that the ends of the shaft 71 are mounted in spaced sets of bearings 77, each set being mounted on the free (inner) end of its own spring leaf arm 79. The opposite (outer) end of each arm is mounted by bearings 81 on a shaft 83 which is mounted by the bearings 85 on the frame 30a of the vehicle. Tension springs 87 and 89 (FIG. 5) urge each of the arms 79 and thus the associated head to assume an inward position, from which the head can be pushed outwardly in accordance with the pressure of contact of the head and the berry plants. If desired a pneumatic cylinder could be used instead of, or in addition to, the springs.

The actuating mechanism includes a pair of cross shafts 91 and 93 having fixed weights 95 and 96, respectively, each shaft being rotary driven from a motor (not shown but located on the frame of the machine) via chain drives 97 and 99, bevel gearing 101 and chain drives 103. The bevel gearing causes the weights 95 and 96 to rotate in opposite directions within the head 13a. Such movement of the weights imparts an orbital or circular movement to the tines 16a of the head 13a. That is to say, when the weights are disposed as shown in FIG. 4, the head will be urged downwardly (flexing the arms 79 in doing so); and when the weights are 90° from the FIG. 4 position they will be 180° apart from one another to impart a twist or turn to the head; and when the weights are both up, the head is forced upwardly; and when the weights have traveled 90° more they will be 180° apart and cause the head 13a to twist or turn in the opposite direction from that described above. These movements of the head can be characterized as a reverse twisting action. The above movements thus cause each of the tines 16a to move in a cylindrical path about the stationary axis of the tine to enable the tines to dislodge berries without substantial harm to the berry plants.

The amplitude of tine movement preferably is such that the paths of movement overlap one another or approach an overlapping relationship. The tines 16a have an equal degree of movement from end to end as do the tines 16 of the first form of the invention.

FIGS. 6 and 7 show another form of the invention, only one of the two heads being shown and labeled 13b. This head is in the form of a drum freely rotatably mounted by bearings 111 on a vertical shaft 113, the latter fixedly carrying a weight 115 which is medially disposed on the shaft. Each end of the shaft 113 is mounted in a bearing 117 on its own arm 119, each arm being pivotally mounted on its own short vertical shaft 121 which is rotatably mounted by a bearing structure 123 on the frame 30b of the machine. A pair of springs, like 87 and 89 in FIG. 5, are provided for each arm 119 for the same purpose as in FIG. 5, one such spring 87b being shown.

The shaft 113 is driven by a motor (not shown) via a chain drive 125 to the shaft 121, and by a chain drive from shaft 121 to shaft 113. The weight 115 is thus rotatably driven at a rate considerably faster than the slow revolving movement imparted to the free wheeling drum 13b by its contact with the berry plants, and causes the drum to oscillate back and forth about the pivotal axis of shaft 121. Thus the tines 16b of the drum 13b that are in contact with the plants are oscillated back and forth to shake the plants and dislodge berries therefrom. Although the drum 13b is free-wheeling, its mass is sufficient when related to the frequency of oscillation of the drum to cause the tines to impart an effective shaking force to the berry plants. The same explanation applies to the first two forms of the invention as regards the horizontal component of movement imparted to the heads and the tines of the heads.

While the invention has been described in relation to harvesting berries, the invention may have application to harvesting other fruits and crops.

Having described the invention in what is considered to be the preferred embodiment thereof, it is desired that it be understood that the invention is not to be limited other than by the provisions of the following claims.

We claim:

1. A row-type harvester of the type including a mobile vehicle for movement along a row of upright plants to be harvested,
   a tined head mounted for free wheeling rotation about a vertical axis and carried by said vehicle in a position for the tines thereof to penetrate the plants, and
   means for imparting to said head an orbital or circular movement, the path of which is vertically oriented and whose magnitude is uniform from end to end of said head.

2. A row-type harvester as set forth in claim 1, wherein said means includes eccentric weight means mounted within said head for movement about a horizontal axis and wherein the mass of the weight means is such as to cause the paths of movement of adjacent tines to overlap.

3. A row-type harvester as set forth in claim 2, wherein said weight means includes a weight on either side of the axis of rotation of said head.

4. A row-type harvester as set forth in claim 3, wherein said weights rotate in the same direction.

5. A row-type harvester as set forth in claim 3, wherein said weights rotate in opposite directions.

6. A row-type harvester as set forth in claim 1, wherein the orbital or circular movement is about an axis which is transverse to the length of said vehicle.

7. A row-type harvester as set forth in claim 6, wherein there are arm means mounting said head for bodily swinging movement relative to said vehicle toward and away from the row of plants.

8. A row-type harvester as set forth in claim 7, wherein there are drive means carried at least in part by said arm means for driving said head.

9. A row-type harvester of the type including a mobile vehicle for movement along a row of upright plants to be harvested, a tined head disposed in a position for the tines thereof to penetrate the plants, said vehicle including a frame, said tined head being mounted on said frame for free wheeling rotation about a vertical axis whereby contact of said head with the plants as the vehicle moves along a row of plants will cause said head to roll along said row at a rate of rotation proportional to the rate of movement of said vehicle, means mounting said head for vertical movement relative to said frame, and means for imparting to said head a vibratory movement having a frequency substantially greater than said rate of rotation of said head wherein said vibratory movement includes a reversing twisting action about the axis of said head coupled with vertical reciprocation of said head.

10. A row-type harvester including a mobile vehicle adapted for movement along a row of upright plants to be harvested, said vehicle having a frame,
a tined head,
mounting means mounting said head for free wheeling rotary movement about a vertical axis,
said mounting means including first and second spring means disposed respectively above and below said head and supportingly connected to said head, and
eccentric weight means for effecting vibration of said head.

11. A row-type harvester as set forth in claim 10, wherein there are lower and upper arm means disposed respectively above and below said head and wherein said first and second spring means are anchored respectively to said upper and lower arm means.

12. A row-type harvester including a mobile vehicle adapted for movement along a row of upright plants to be harvested, said vehicle having a frame,
a tined head,
mounting means mounting said head for free wheeling rotary movement about a vertical axis, and for bodily swinging movement relative to said frame, and
means for causing said head to oscillate about the swinging axis thereof.

13. A row-type harvester including a mobile vehicle adapted for movement along a row of upright plants to be harvested, said vehicle having a frame,
a tined head,
mounting means mounting said head for free wheeling rotary movement about a vertical axis,
said mounting means including resilient means resiliently supporting said head for bodily movement at least in a direction transverse to the axis of said head, and
means for imparting vibratory movement to said head at least in said direction to cause vibration of the tines to shake the plants.

References Cited

UNITED STATES PATENTS

| | | | |
|---|---|---|---|
| 3,184,908 | 5/1965 | Rust | 56—330 |
| 3,245,211 | 4/1966 | Weygandt et al. | 56—330 |
| 3,325,984 | 6/1967 | Christie et al. | 56—330 |
| 3,413,789 | 12/1968 | Studer | 56—330 |

RUSSELL R. KINSEY, Primary Examiner